(12) United States Patent
Barrea et al.

(10) Patent No.: US 11,606,578 B1
(45) Date of Patent: Mar. 14, 2023

(54) METHOD AND APPARATUS FOR PERFORMING COMPRESSION OF A COLOR IMAGE

(71) Applicant: intoPIX S.A., Mont-Saint-Guibert (BE)

(72) Inventors: Allan Barrea, Mont-Saint-Guibert (BE); Naomi Rousseau, Mont-Saint-Guibert (BE); Pascal Pellegrin, Mont-Saint-Guibert (BE); Gaël Rouvroy, Mont-Saint-Guibert (BE); Christophe Biernaux, Mont-Saint-Guibert (BE); Charles Buysschaert, Mont-Saint-Guibert (BE)

(73) Assignee: intoPix S.A., Mont-Saint-Guibert (BE)

( * ) Notice: Subject to any disclaimer, the term of this patent is extended or adjusted under 35 U.S.C. 154(b) by 13 days.

(21) Appl. No.: 17/412,392

(22) Filed: Aug. 26, 2021

(51) Int. Cl.
*H04N 19/635* (2014.01)
*H04N 19/186* (2014.01)
*G06T 9/00* (2006.01)
*H04N 1/64* (2006.01)

(52) U.S. Cl.
CPC ............. *H04N 19/635* (2014.11); *G06T 9/00* (2013.01); *H04N 1/64* (2013.01); *H04N 19/186* (2014.11); *G06T 2207/20064* (2013.01)

(58) Field of Classification Search
CPC ...... H04N 19/635; H04N 1/64; H04N 19/186; G06T 9/00; G06T 2207/20064
See application file for complete search history.

(56) References Cited

U.S. PATENT DOCUMENTS 9,332,258 B2 5/2016 Pellegrin et al.
2019/0114809 A1* 4/2019 Vosoughi .................. G06T 9/40

FOREIGN PATENT DOCUMENTS

WO WO 2021/084118 A1 5/2021

OTHER PUBLICATIONS

European Search Report in European Patent Application No. 21193356. 9, dated Jan. 21, 2022, 8 pages.
Thomas Richter et al., "Bayer CFA Pattern Compression With JPEG XS," IEEE Transactions on Image Processing, vol. 30, Jul. 16, 2021, pp. 6557-6569, ISSN: 1057-7149, DOI: 10.1109/TIP.2021.3095421 [retrieved on Jul. 20, 2021], 13 pages.

(Continued)

*Primary Examiner* — Christopher Wait
(74) *Attorney, Agent, or Firm* — Finnegan, Henderson, Farabow, Garrett & Dunner, LLP

(57) ABSTRACT

The disclosure relates to a method for compressing in a packed data set a color image comprising color image samples arranged in a reference grid according to a sampling pattern, and comprising the steps of (a) performing a decorrelative transform providing component images, (b) performing a number of discrete wavelet decompositions on said component images and (c) forming packets in the packed data set by processing each consecutive line in the reference grid and each component and grouping all samples of said component in said line in one or more packets, and appending said one or more packets to the packed data set. The disclosure also relates to a device for compressing, a computer program for compressing, a method for decompressing, a device for decompressing, and a computer program for decompressing. The disclosure also relates to the packed data set produced by said method for compressing.

17 Claims, 10 Drawing Sheets

(56) References Cited

OTHER PUBLICATIONS

Coding and Analysis Subgroup: "text of ISO/IEC 21122 WD (JPEG XS) v2.8" 75. JPEG Meeting; Mar. 26, 2017-Mar. 31, 2017; Sydney; (Joint Picture Expert Group or ISO/IEC JTC1/SC29/WG1); URL: https://www.iso.org, No. wg1m75019, Jun. 19, 2017, XP030190371, 60 pages.
ISO/IEC, JTC 1 SC 29 / WG 1 N91029 , JPEG XS low-latency lightweight image coding system—Part 1: Core Coding System, 91 Meeting, Apr. 2021.
ISO/IEC JTC 1 /SC 29 / WG 1 N92027, JPEG XS low-latency lightweight image coding system—Part 2: Profiles and buffer models, 92 Meeting, Jul. 2021.

\* cited by examiner

| C0_LL0 | C1_LL0 | C0_LL0 | C1_LL0 | C0_LL0 | C1_LL0 | C0_LL0 | C1_LL0 |
|---|---|---|---|---|---|---|---|
| C2_E | C3_LL0 | C2_E | C3_LL0 | C2_E | C3_LL0 | C2_E | C3_LL0 |
| C0_LH0 | C1_LH0 | C0_LH0 | C1_LH0 | C0_LH0 | C1_LH0 | C0_LH0 | C1_LH0 |
| C2_O | C3_LH0 | C2_O | C3_LH0 | C2_O | C3_LH0 | C2_O | C3_LH0 |
| C0_LL0 | C1_LL0 | C0_LL0 | C1_LL0 | C0_LL0 | C1_LL0 | C0_LL0 | C1_LL0 |
| C2_E | C3_LL0 | C2_E | C3_LL0 | C2_E | C3_LL0 | C2_E | C3_LL0 |

FIG. 3

| C0_LL0 | C1_LL0 | C0_HL0 | C1_HL0 | C0_LL0 | C1_LL0 | C0_HL0 | C1_HL0 |
|---|---|---|---|---|---|---|---|
| C2_E | C3_LL0 | C2_E | C3_HL0 | C2_E | C3_LL0 | C2_E | C3_HL0 |
| C0_LH0 | C1_LH0 | C0_HH0 | C1_HH0 | C0_LH0 | C1_LH0 | C0_HH0 | C1_HH0 |
| C2_O | C3_LH0 | C2_O | C3_HH0 | C2_O | C3_LH0 | C2_O | C3_HH0 |
| C0_LL0 | C1_LL0 | C0_HL0 | C1_HL0 | C0_LL0 | C1_LL0 | C0_HL0 | C1_HL0 |
| C2_E | C3_LL0 | C2_E | C3_HL0 | C2_E | C3_LL0 | C2_E | C3_HL0 |

FIG. 4

METHOD AND APPARATUS FOR PERFORMING COMPRESSION OF A COLOR IMAGE

TECHNICAL FIELD

The present disclosure relates to a method, device, and computer program for compressing and decompressing a color image, and more specifically to the packetization of samples in a packed data set. The disclosure also relates to the packed data set produced by said method for compressing.

BACKGROUND

Color image sensors producing color images are known in the industry. Video bandwidth requirements are growing fast, as video resolutions, frame rates and numbers of streams to manage are constantly increasing. The JPEG XS standard, a new standard for visually lossless low-latency lightweight image coding is currently being defined by the JPEG Committee (formally known as ISO/IEC JT1/SC29/WG1) and is described in:

JPEG XS low-latency lightweight image coding system—Part 1: Core Coding System (Hereafter Reference 1) (ISO/IEC JTC 1/SC 29/WG 1 N91029-91th Meeting—online—April 2021)

JPEG XS low-latency lightweight image coding system—Part 2: Profiles and buffer models (Hereafter Reference 2) (ISO/IEC JTC 1/SC 29/WG 1 N92027 92th Meeting—Online—July 2021)

The JPEG XS standard defines a progression order, formally defined in Annex B, subclause B.7 of Reference 1. This progression order is dubbed "RLBC" for "Resolution-Line-Band-Component". Note that a "band" in the JPEG XS standard is called "subband" in this document. This means that subbands are first serialized by component, then by subband, then by subband line, then by resolution. Resolution level in the JPEG XS standard is similar to the decomposition level in this document. Lowest resolution level is numbered 0. Resolution level is increased by 1 after each bidirectional, i.e. vertical and horizontal, inverse DWT (Digital Wavelet Transform) decomposition.

Document International Application WO 2021/084118 discloses an image processor for processing an image comprising pixels arranged in a Bayer pattern, and providing a highly decorrelated image.

Document U.S. Pat. No. 9,332,258 discloses a method and device for display stream compression, wherein coefficients are grouped, for each group, the greatest coded line index (GCLI) is determined and only the GCLI lowest weight bits of the coefficients are copied into the output stream together with the value of the GCLI. The GCLI is also known in the art as the bitplane count.

SUMMARY

Embodiments of the present disclosure provide a more efficient method for compressing and decompressing of a color image.

In a first aspect, a method is provided for compressing a color image comprising color image samples $S_{ij}$ arranged in a reference grid according to a sampling pattern, the reference grid comprising a number of lines and columns, the index i starting at 0 and increasing with the lines, and the index j starting at 0 and increasing with the columns, into a packed data set, comprising the steps of:

a) performing a decorrelative transform, where for each position (i,j) of the reference grid, a component sample $Ck_{ij}$ is determined, k being a component index depending on the sampling pattern, $Ck_{ij}$ being a linear combination of the image samples $S_{i'j'}$ at positions (i',j'), where i' is comprised between i−4 and i+4, and j' is comprised between j−4 and j+4, producing component images C0, C1, and C2, and, depending on the sampling pattern, an optional component image C3;

b) repeating for each component Ck:
Nlky being a number of vertical DWT decompositions to be applied to component Ck, being an integer >=0,
Nlkx being a number of horizontal DWT decompositions to be applied to component Ck, being an integer >=Nlky,
considering the component Ck as an auxiliary subband;
if Nlky>0, repeat, for n=0 to Nlky−1
performing on said auxiliary subband a vertical DWT decomposition, by performing a lifting scheme with (5,3) filter-bank on the columns of said auxiliary subband, the resulting even numbered samples being a LLn subband, the resulting odd numbered samples being a LHn subband, keeping for each resulting sample a reference to the position (i,j) in the reference grid wherefrom they are determined;
performing on said LLn subband a horizontal DWT decomposition, by performing a lifting scheme with (5,3) filter-bank on the lines of said subband, the resulting even numbered samples being a LLn subband, the resulting odd numbered samples being a HLn subband, keeping for each resulting sample a reference to the position (i,j) in the reference grid wherefrom they are determined;
performing on said LHn subband a horizontal DWT decomposition, by performing a lifting scheme with (5,3) filter-bank on the lines of said subband, the resulting even numbered samples being a LHn subband, the resulting odd numbered samples being a HHn subband, keeping for each resulting sample a reference to the position (i,j) in the reference grid wherefrom they are determined;
considering subband LLn as an auxiliary subband;
if Nlkx>Nlky, repeat, for n=Nlky to Nlkx−1
performing on said LLn−1 subband a horizontal DWT decomposition, by performing a lifting scheme with (5,3) filter-bank on the lines of said subband, the resulting even numbered samples being a LLn subband, the resulting odd numbered samples being a HLn subband, keeping for each resulting sample a reference to the position (i,j) in the reference grid wherefrom they are determined;
considering subband LLn as an auxiliary subband;

c) for each consecutive line of the reference grid,
for each component Ck,
grouping all samples of said component Ck in said line in one or more packets;
appending said one or more packets to the packed data set.

In processing step c) the method processes all the lines of the reference grid in the order of increasing index i. For a given line, all the components are processed in any order, provided this order is the same when compressing and decompressing the packed data set. This order may be the order of increasing k.

In the context of the present disclosure:
packetization is the formation of packets and appending of packets to the packed data set;
subbands and component images are composed of even lines of even numbered samples and odd numbered samples, followed by odd lines of even numbered samples and odd numbered samples;
when performing the decorrelative transforms and the lifting scheme operations for pixel positions near the borders of the image, when samples outside the borders of the image are needed for performing the computations, the values of the samples which are in mirror position of the missing samples with respect to the border of the image may be taken as replacement;
when performing the lifting scheme operations, assigning low frequency samples to even numbered locations and high frequency samples to odd numbered locations is equivalent to assigning high frequency samples to even numbered locations and low frequency samples to odd numbered locations;
when performing bidirectional, i.e. vertical and horizontal DWT decompositions, performing a vertical DWT decomposition followed by a horizontal DWT decomposition is equivalent to performing a horizontal DWT decomposition followed by a vertical DWT decomposition
when performing the decorrelative transform of step a), the linear combination may be taken from the immediately neighboring pixels (i' comprised between i−1 and i+1, and j' comprised between j−1 and j+1), or from the further neighboring pixels (i' comprised between i−2 and i+2, and j' comprised between j−2 and j+2), or from the still further neighboring pixels (i' comprised between i−3 and i+3, and j' comprised between j−3 and j+3).

In an embodiment, the number Nlky of vertical DWT decompositions may be equal to 0 or 1.

Between step b) and step c), an entropy coding of the data may be performed.

Said entropy coding may comprise an entropy coding of the bitplane count of groups of samples.

The step of grouping bitplane counts of groups of samples, and grouping data representing the bitplanes may be performed In said sampling pattern, each pixel position may comprise samples arranged in a Bayer pattern, a Bayer pattern being, for each even i and j coordinates in the reference grid, a juxtaposition of a red pixel R at position (i,j), a first green pixel G1 at position (i,j+1), a second green pixel G2 at position (i+1,j), and a blue pixel B at position (i+1,j+1), said decorrelative transform producing a component image C0 for the positions of the red pixels, a component image C1 for the positions of the first green pixels, a component image C2 for the positions of the second green pixels, and a component image C3 for the positions of the blue pixels.

In said sampling pattern, each pixel position may comprise samples arranged in a 4:4:4 pattern, a 4:4:4 pattern being, for each i and j coordinates in the reference grid, a superposition at position (i,j) of a luminance pixel Y, a blue chrominance pixel Cb, and a red chrominance pixel Cr, or of a red pixel R, a green pixel G, and a blue pixel B, said decorrelative transform producing a component image C0 for the positions of the luminance or red pixels, a component image C1 for the positions of the blue chrominance or green pixels, and a component image C2 for the positions of the red chrominance or blue pixels.

In said sampling pattern, each pixel position may comprise samples arranged in a 4:2:2 pattern, a 4:2:2 pattern being, for each i and each even j coordinates in the reference grid, an arrangement at position (i,j) of a luminance pixel Y, a blue chrominance pixel Cb, and a red chrominance pixel Cr, and a luminance pixel Y at position (i,j+1), said decorrelative transform producing a component image C0 for the positions of the luminance pixels, a component image C1 for the positions of the blue chrominance pixels, and a component image C2 for the positions of the red chrominance pixels.

The decorrelative transform may be an identity mapping, where each sample of the color image is mapped to a corresponding position on the component images.

The decorrelative transform may also be an in-line or a full Star-Tetrix transform. The in-line and full Star-Tetrix transforms are described in Annex F of Reference 1.

According to a second aspect, a device for compressing a color image is provided comprising color image samples Sij arranged in a reference grid according to a sampling pattern, the reference grid comprising a number of lines and columns, the index i starting at 0 and increasing with the lines, and the index j starting at 0 and increasing with the columns, into a packed data set, comprising:
a) electronic components configured for performing step a) of the compression method;
b) electronic components configured for performing step b) of the compression method;
c) electronic components configured for performing step c) of the compression method.

According to a third aspect, a computer program is provided comprising instructions which, when the program is executed by a computer, causes the computer to carry out the steps of the method for compressing of the disclosure.

According to a fourth aspect, a packed data set is provided obtainable by compressing a color image with the method for compressing of the disclosure, the packed data set comprising a sequence of packets with the following characteristics:
each packet containing only data from a single component image;
each packet containing only data from a single line of a component image;
all packets containing data from a given line of a component image being located in the packed data set before any packet containing data from a subsequent line of any component image.

According to a fifth aspect, a method is provided for decompressing a packed data set obtainable by performing a method for compressing of the disclosure, comprising the steps of:
unpacking the packets comprised in the packed data set;
performing an inverse DWT decomposition;
performing an inverse decorrelative transform.

According to a sixth aspect, a device is provided for decompressing a packed data set obtainable by performing a method for compressing of the disclosure, comprising electronic components configured for:
unpacking the packets comprised in the packed data set;
performing an inverse DWT decomposition;
performing an inverse decorrelative transform.

According to a seventh aspect, a computer program is provided comprising instructions which, when the program is executed by a computer, causes the computer to carry out the steps of the method for decompressing of the disclosure.

BRIEF DESCRIPTION OF THE DRAWINGS

These and further aspects of the present disclosure will be explained in greater detail by way of example and with reference to the accompanying drawings in which:

FIG. 1 represents schematically a portion of a color image, the sampling pattern being a Bayer pattern;

FIG. 2a represents schematically the component images resulting from a decorrelative transform of the color image of FIG. 1, where each component sample Ckij is represented at the position (i,j) in the reference grid wherefrom it is determined;

FIG. 2b represents schematically the component images resulting from a decorrelative transform of the color image of FIG. 1, where component image samples are grouped in component images;

FIG. 3 represents schematically the same portion of the component images as in FIG. 2 after application of a single vertical DWT decomposition on components C0, C1 and C3, and no decomposition for component C2, where each component sample Ckij is represented at the position (i,j) in the reference grid wherefrom it is determined;

FIG. 4 represents schematically the same portion of the component images as in FIG. 3 after application of a single horizontal DWT decomposition on components C0, C1 and C3, and no decomposition for component C2, where each component sample Ckij is represented at the position (i,j) in the reference grid wherefrom it is determined;

DETAILED DESCRIPTION

Figures 1, 2A:
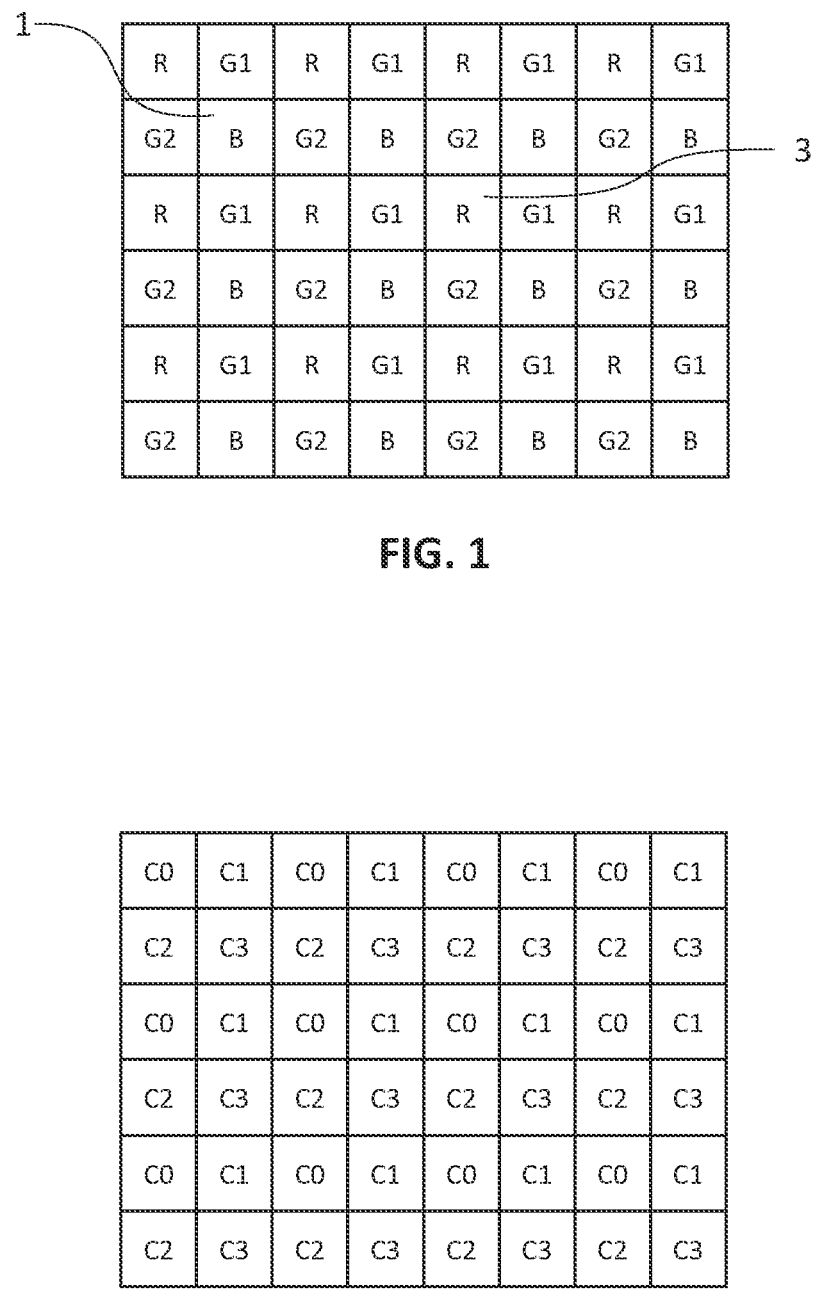
Figures 5, 6:
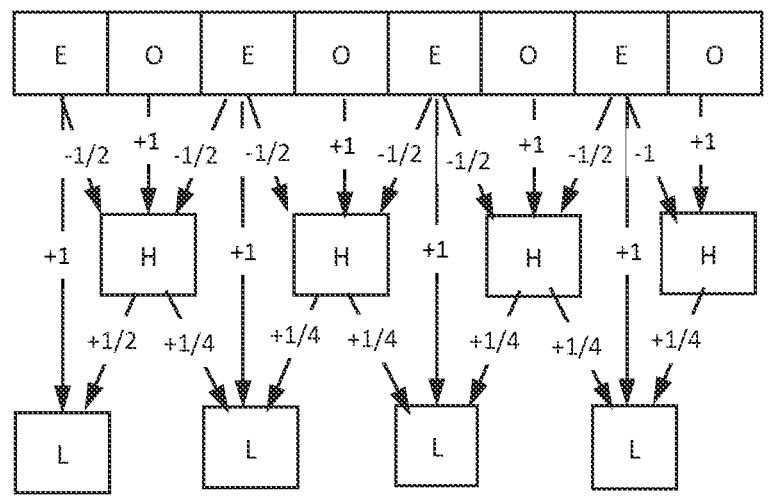
FIG. 5 represents schematically the same portion of the component images as in FIG. 3 after application of a single horizontal DWT decomposition on components C0, C1 and C3, and no decomposition for component C2, where component image samples are grouped in component images and where samples are grouped by subband in each component image; only data for component image C0 is represented.
FIG. 6 represents schematically how a DWT decomposition performs a lifting scheme with (5,3) filter-bank on a line of samples.

FIG. 1 is a schematic example of a color image obtained from an image sensor having a Bayer pattern. The reference grid represented by the squares may comprise eight columns, for i going from 0 to 7 and six lines, for j going from 0 to 5, the top-left corner having coordinates (0,0). Each pixel position (i,j) contains either a red, a first green, a second green, or a blue sample, according to the Bayer pattern. In a real image, the number of columns and lines may be larger, such as 4096×2160.

FIG. 2a is a representation of the data that may be obtained after a decorrelative transform, where the red, the first green, the second green, and the blue image samples are replaced by samples of components C0, C1, C2, and C3, respectively. As depicted on FIG. 2a, the decorrelative transform may produce a grid of component samples of same dimensions as the reference grid. The transform yielding a given component sample may be centered on the corresponding color image sample. Therefore, the spatial arrangement of input samples may be preserved through the transform.

Here is a non-exhaustive list of such decorrelative transforms:
- identity mapping, where each sample of the input grid is mapped to the corresponding position on the output grid, i.e. for any position (i,j) in the input/output grid, $C0ij$=Rij; $C1ij$=G1ij; $C2ij$=G2ij; $C3ij$=Bij;
- in-line Star-Tetrix transform;
- full Star-Tetrix transform.

Figure 2B:
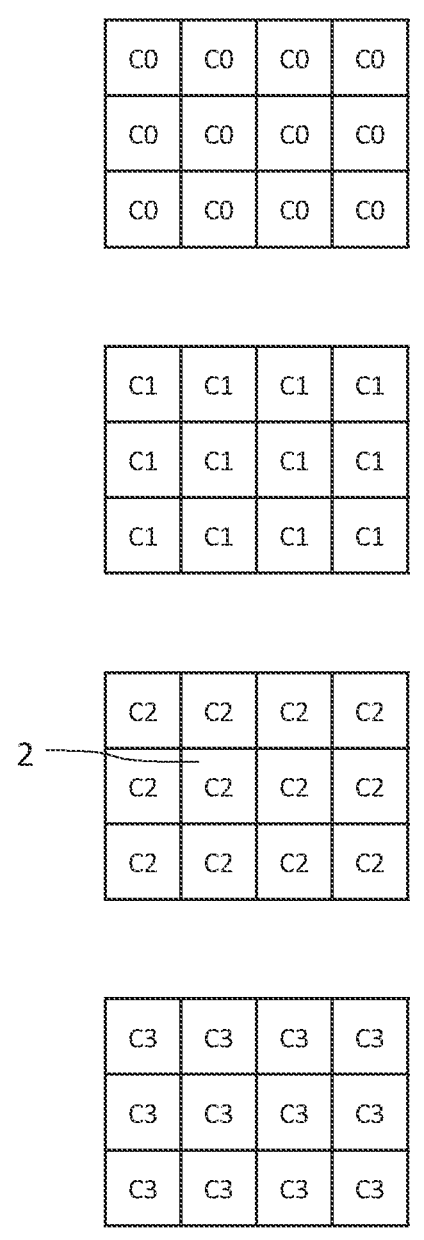

The in-line Star-Tetrix transform and full Star-Tetrix transform are described in Annex F of Reference 1. In FIG. 2a, the samples of the component images are located in the reference grid at the positions of the corresponding color image samples. In FIG. 2b, four distinct component images C0, C1, C2, and C3 are represented not in relation to the reference grid. However, with the knowledge of the sampling pattern and the decorrelative transform, one may determine the position (i,j) in the reference grid wherefrom a given component sample of the component images derives.

FIG. 3 is a representation of the data that may be obtained after the application of a single vertical DWT decomposition on components C0, C1 and C3, and no decomposition for component C2. For components C0, C1, and C3, a subband LL0 and a subband LH0 are created. For component C0 and C1, the subband LL0 appears on grid lines 0 and 4, and the subband LH0 appears on grid line 2. For component C3, these subbands appear one line below. For component C2, no DWT decomposition may be performed, and therefore the original samples of the component image C2 are retained. Meaning of subscripts is as follows: LL=low frequency subband; LH=high frequency subband; E=even line; O=odd line.

FIG. 4 is a representation of the data that may be obtained after the application of one horizontal and one vertical DWT decomposition on components C0, C1 and C3, and no decomposition for component C2, i.e. after the application of a single horizontal DWT decomposition on components C0, C1 and C3 on the data of FIG. 3. LL0 subband from each component may be decomposed into a new LL0 and a HL0 subband. LH0 subband from each component may be decomposed into a new LH0 and a HH0 subband. Each sample may be located at the position (i,j) in the reference grid wherefrom it is determined.

FIG. 5 is a representation of the data that may obtained after the application of one horizontal and one vertical DWT decomposition on components C0, C1 and C3, and no decomposition for component C2, i.e. after the application of a single horizontal DWT decomposition on components C0, C1 and C3 on the data of FIG. 3, where samples are first grouped by component, and then all samples from a given component are grouped by subband. Only data for component C0 is represented in this Figure. A LL0 subband appears on the four positions in the upper left corner. A HL0 subband appears on the four positions in the upper right corner. A LH0 subband appears on the left-hand side of the bottom line, and a HH0 subband appears on the right-hand side of the bottom line. A similar representation can be derived for components C1 and C3. For the non-decomposed component C2, the image is the C2 part of FIG. 2b.

In performing the decorrelative transforms in step a) of the method, and the successive DWT decompositions in step b) of the method, the samples resulting from the transforms and decompositions may keep a reference to the position (i,j) in the reference grid wherefrom they are determined. This may be achieved in different ways; three possible embodiments are described below:

- in a first embodiment, each sample resulting from a transform or decomposition may be stored together with the values (i,j) of the position in the reference grid wherefrom it is determined. This may be done for each operation of the decorrelative transforms, as well as for each successive DWT decomposition.
- in a second embodiment, the resulting samples may be memorized grouped by component and by subband, as represented in FIG. 5.
- in a third embodiment, the samples resulting from a transform or decomposition may be stored in an array at the position (i,j) in the reference grid wherefrom they are determined, i.e. at same line and column coordinates as the original data. Said array may be of same dimensions as the original color image, or may even be the original color image itself, the transforms and decompositions being then the so-called 'in-place' transforms and decompositions. Such an array of same dimensions as the original color image is represented in FIG. 2a, FIG. 3, FIG. 4.

According to said embodiments, step c) of the method may be performed as follows:

- in the first embodiment, step c) of the method may be performed by extracting from the storage the samples corresponding to each consecutive line of the reference grid and each component;
- in the second embodiment, step c) of the method may be performed on the basis of address translation between the addresses in the storage, and positions (i,j) in the reference grid. For example, if the color image is the image of FIG. 1:
  - it may be determined that pixel at position (1,1) of the color image (reference 1 on FIG. 1) corresponds to the 30$^{th}$ sample after the beginning of the component images of FIG. 2b (reference 2 on FIG. 2b);
  - a similar correspondence may be determined for the storage of the subbands on FIG. 5: pixel at position (2,4) of the color image (reference 3 on FIG. 1) corresponds to sample at position (2,4) of the image after DWT decomposition (reference 4 on FIG. 4, sample of component image C0 of subband LH0), and also corresponds to sample at position (2,1) of the subbands image for component image C0 (reference 5 on FIG. 5);
- in the third embodiment, step c) of the method may be performed by scanning the storage line-by-line. For example, if the color image is the image of FIG. 1, step c) may be performed by scanning the array in FIG. 4 line-by-line.

FIG. 6 depicts how a horizontal DWT decomposition may be performed on a line of samples containing a sequence of even (E) and odd (O) samples by decomposing said sequence in a high-pass (H) subband and a low-pass (L) subband. Odd samples may first be replaced by performing a lifting scheme with (5,3) filter-bank on said line of samples, the resulting odd numbered samples being a H (high spatial frequency) subband, according to the equation $$H_i = O_i - \tfrac{1}{2} * (E_{i-1} + E_{i+1}).$$

Even samples may then be replaced by performing the operation $$L_i = E_i + \tfrac{1}{4} * (H_{i-1} + H_{i+1}),$$

producing a L (low spatial frequency) subband. As is well known, formulas where odd and even samples are interchanged in the above formulas are equivalent. When samples outside the image are needed, the corresponding samples at mirror position with respect to the border, inside the image, may be taken. This results in the factor $+\tfrac{1}{2}$ instead of $+\tfrac{1}{4}$ at the left, below in the diagram (arrow going from H to L), and a factor $-1$ instead of $-\tfrac{1}{2}$ at the right, above in the diagram (arrow going from E to H).

In FIG. 8, FIG. 10, FIG. 11, FIG. 12, and FIG. 13, numbered arrows represent packets and associated numbers indicate serialization order in the packed data set, i.e. the order in which packets are appended to the packed data set; a packet associated with a lower number is serialized before a packet associated with a bigger number. A packet may regroup all samples from all subbands covered by the corresponding arrow starting from the tail of the arrow to its head.

Figure 14:
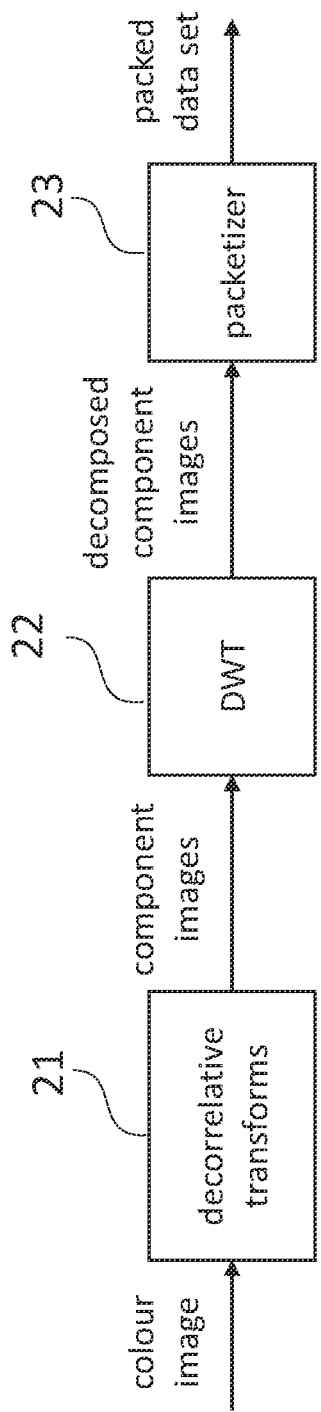
FIG. 14 depicts a device for compressing a color image.

FIG. 14 depicts a device 20 for compressing a color image, comprising a module 21 for performing a decorrelative transform on said color image, a module 22 for performing a DWT on a component image, and a module 23 for packetizing the decomposed component images and producing a packed data set. Each of these modules may comprise hardware such a gates and registers, FPGAs, ASICs and/or microcontrollers.

Figure 15:
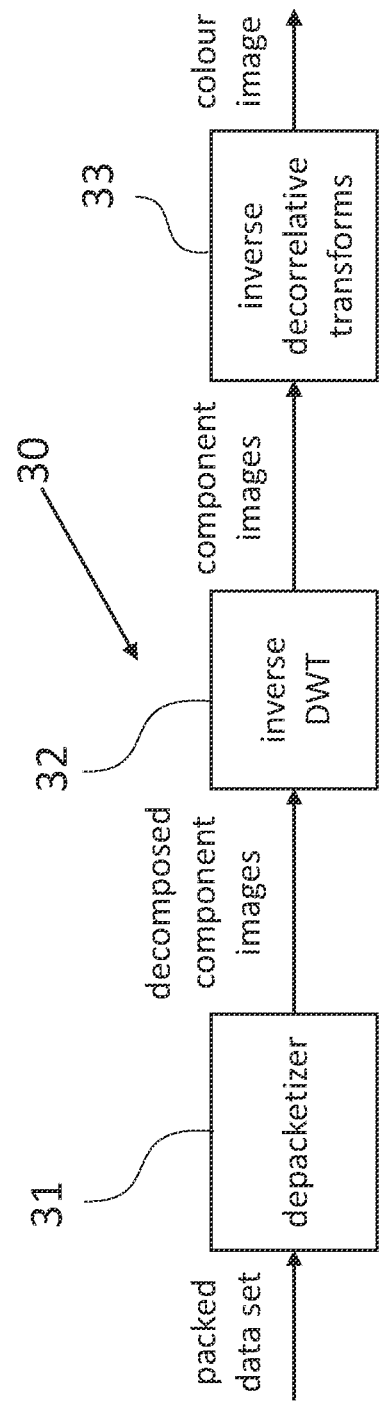
FIG. 15 depicts a device for decompressing a color image.

FIG. 15 depicts a device 30 for decompressing a packed data set, comprising a module 31 for depacketizing said packed data set, a module 32 for performing an inverse DWT on a decomposed component image, and a module 33 for performing an inverse decorrelative transform on a component image. Each of these modules may comprise hardware such a gates and registers, FPGAs, ASICs and or microcontrollers.

Example 1

Figure 7:
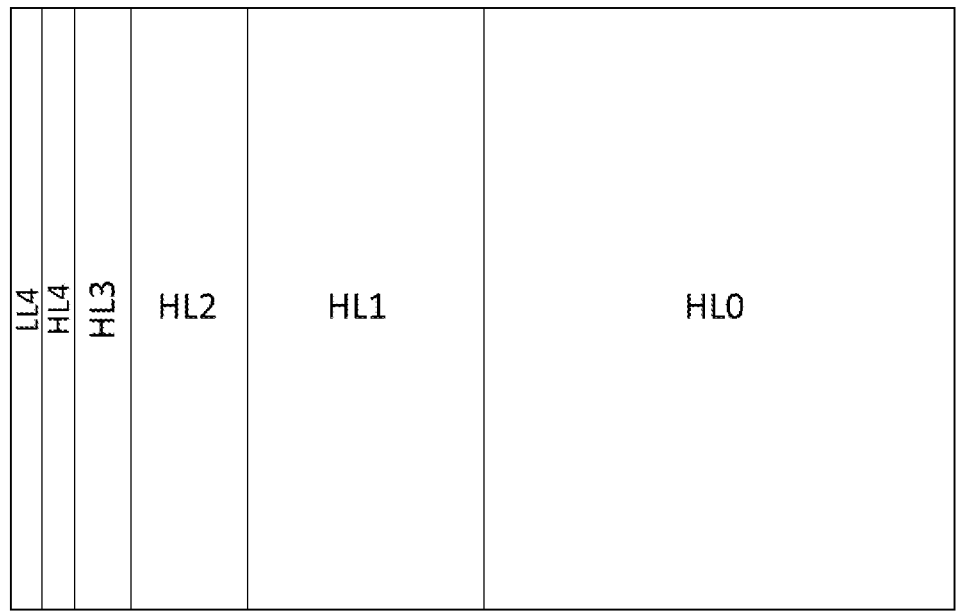
FIG. 7 represents schematically subbands produced after no vertical DWT decomposition followed by 5 horizontal DWT decompositions of a component image.
Figure 8:
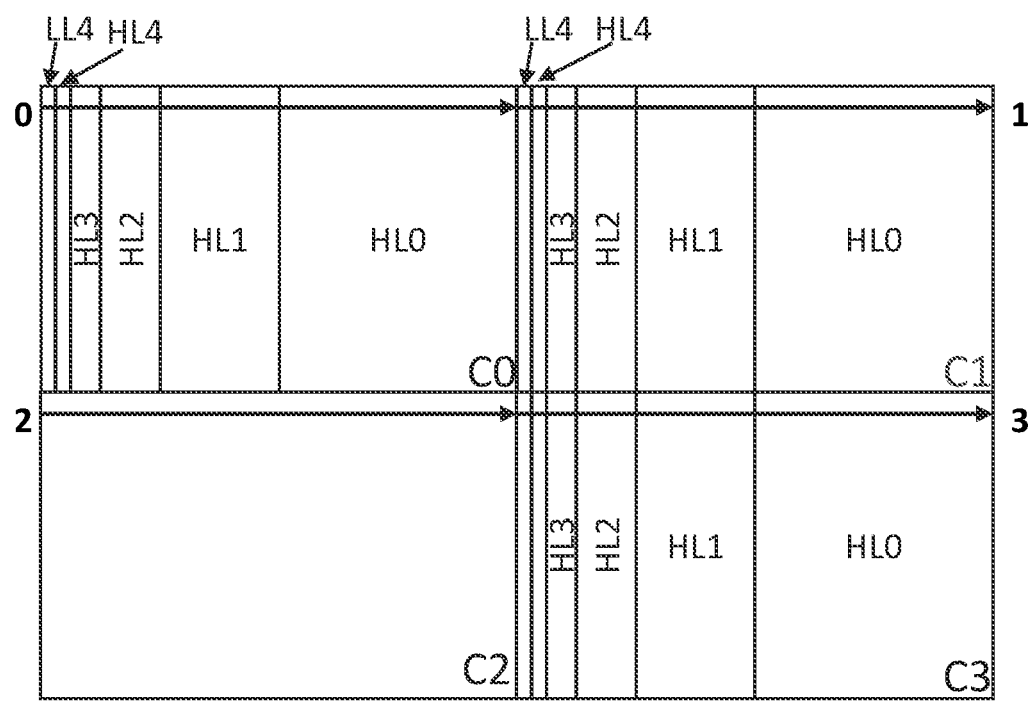
FIG. 8 represents schematically subbands in the case where component images C0, C1 and C3 are decomposed as in FIG. 7 and component image C2 is not decomposed, and numbered arrows delimiting the samples for forming packets and serializing them in the packed data set according to the disclosure.

In a first example embodiment of the disclosure, the color image may be sampled according to a Bayer pattern. In step b) of the method, the number of vertical decompositions Nlky is equal to zero for all components, and the number of horizontal decompositions Nlkx is equal to 5 for components C0, C1 and C3, and is equal to zero for component C2. FIG. 7 is a representation of the subbands resulting from this decomposition, for any of the decomposed components. FIG. 8 represents the four components together. According to the disclosure, successive packets are formed containing the data corresponding to the four numbered arrows, marked "0", "1", "2", and "3", representing the result of the performance of step c) of the method. The first line of the reference grid may be analyzed and may comprise components C0 and C1. All samples of component C0 are represented as arrow "0". These samples are packed in the packed data set in one or more packets. The samples of component C1 (arrow "1") are then packed in the packed data set in one or more packets. The second line of the reference grid may be analyzed in the same way, comprising components C2 and C3, and packets corresponding to arrows "2" and "3". Subsequent lines of the reference grid are processed in the same way up to the last line of the reference grid.

Example 2

Figure 9:
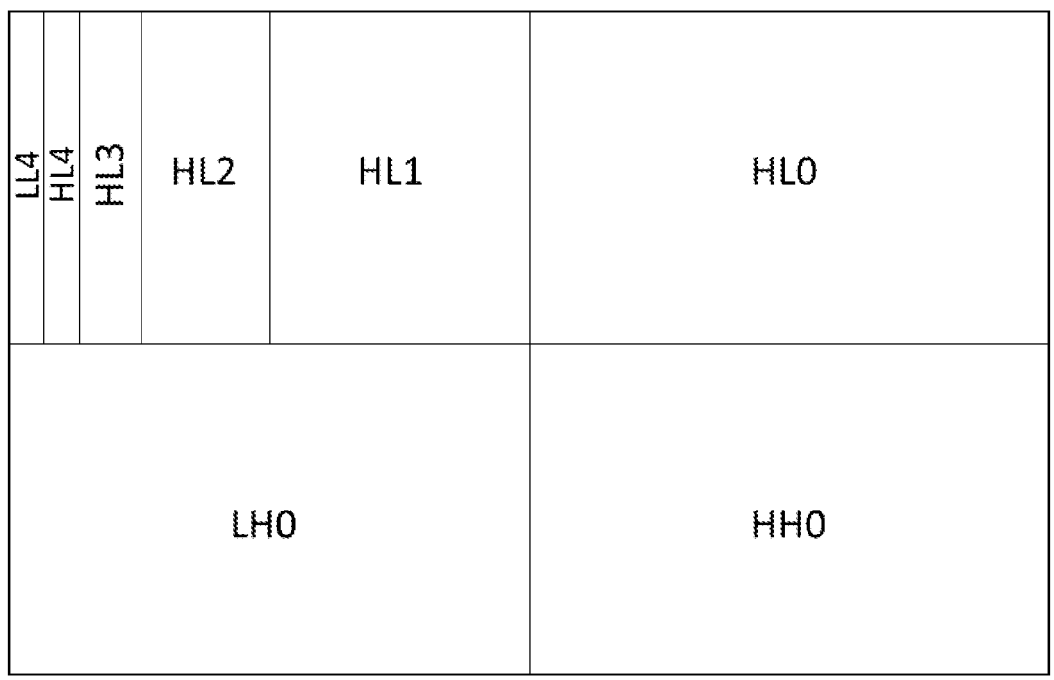
FIG. 9 represents schematically subbands produced after one vertical DWT decomposition followed by 5 horizontal DWT decompositions of a component image.
Figure 10:
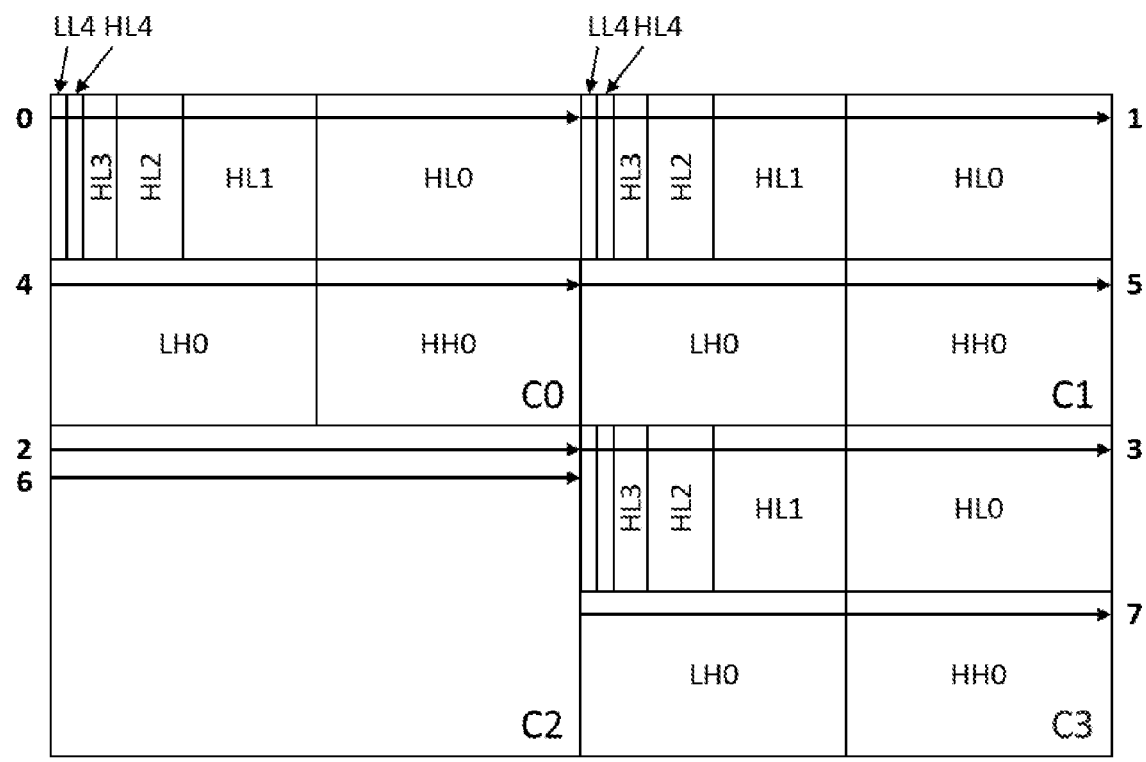
FIG. 10 represents schematically subbands in the case where component images C0, C1 and C3 are decomposed as in FIG. 9 and component image C2 is not decomposed, and numbered arrows delimiting the samples for forming packets and serializing them in the packed data set according to the disclosure.
Figure 11:
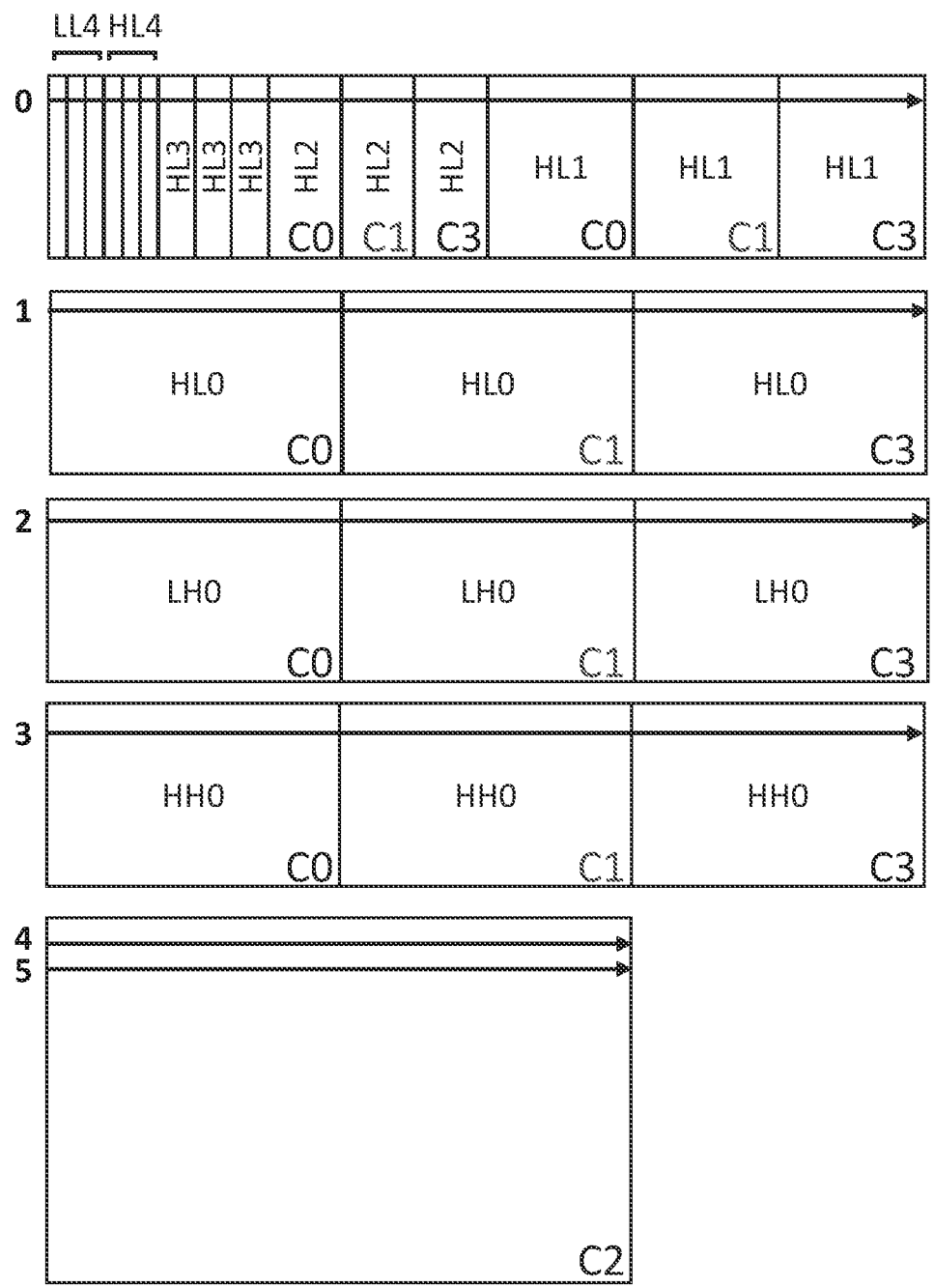
FIG. 11 represents schematically subbands in the case where component images C0, C1 and C3 are decomposed as in FIG. 9 and component image C2 is not decomposed, and numbered arrows delimiting the samples for forming packets and serializing them in the packed data set according to the JPEG XS standard.

In a second example embodiment of the disclosure, the color image is also sampled according to a Bayer pattern. The number of vertical decompositions Nlky is equal to one for components C0, C1 and C3, and is equal to zero for component C2, and the number of horizontal decompositions Nlkx is equal to 5 for components C0, C1 and C3, and is equal to zero for component C2. FIG. 9 is a representation of the subbands resulting from this decomposition, for any of the decomposed components. FIG. 10 represents the four components together.
Arrows numbered "0" to "7" represent the result of the performance of step c) of the method.
The first line of the reference grid may be analyzed and may comprise components C0 and 01 wherein samples of arrows "0" and "1" are treated.
The second line of the reference grid may be analyzed and may comprise components C2 and C3 wherein samples of arrows "2" and "3" are treated.
The third line of the reference grid may be analyzed and may comprise components C0 and 01 wherein samples of arrows "4" and "5" are treated.
The fourth line of the reference grid may be analyzed and may comprise components C2 and C3 wherein samples of arrows "6" and "7" are treated. Subsequent lines of the reference grid are processed in the same way up to the last line of the reference grid.
FIG. 11 represents schematically subbands in a case similar to FIG. 10, but where the numbered arrows delimiting the samples for forming and serializing packets are determined according to the JPEG XS standard.
One can observe that in the method of the disclosure, a given packet always contain data from a single component image, whereas in the JPEG XS standard, a packet may contain data from different component images.

Example 3

Figure 12:
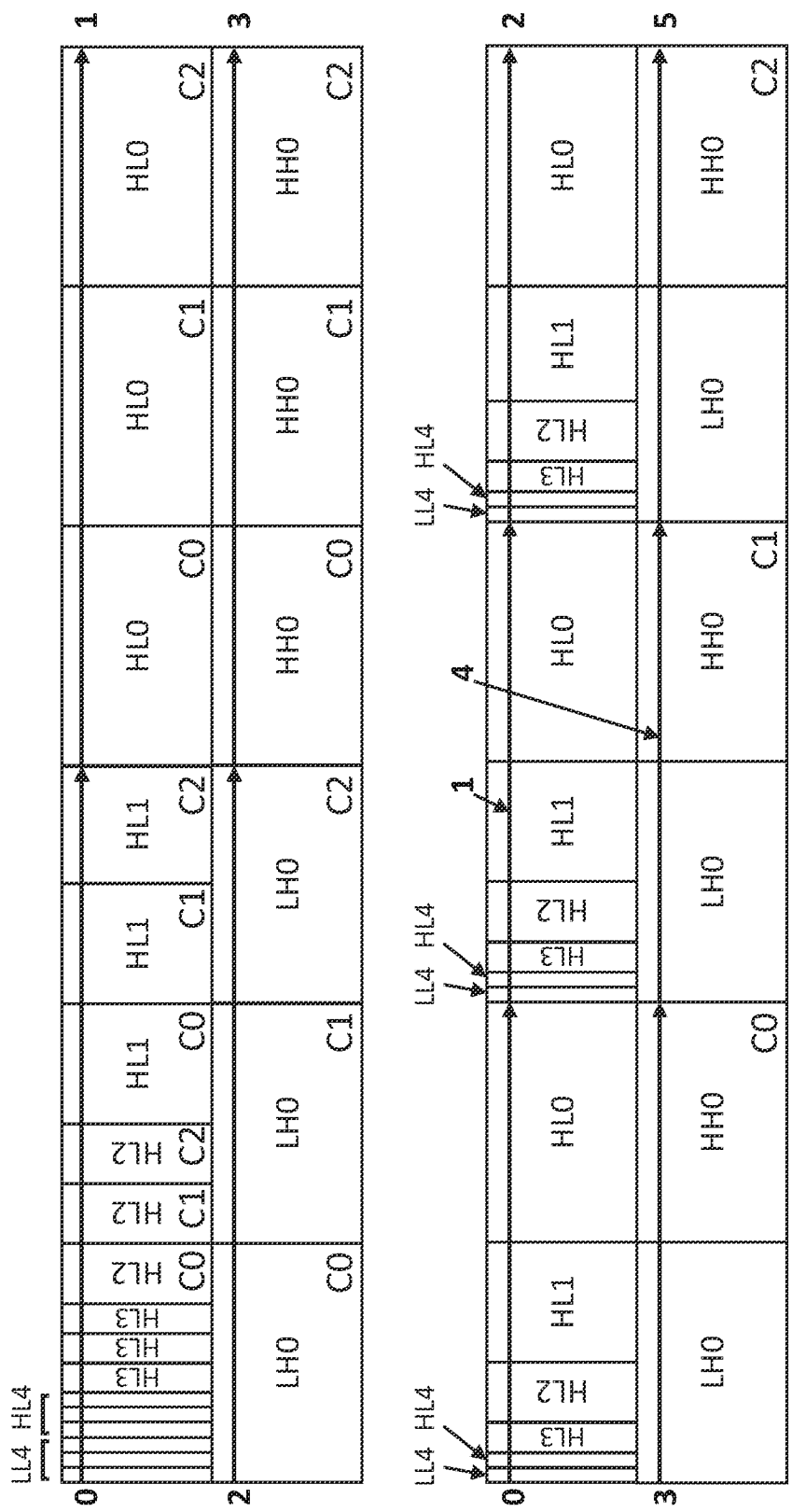
FIG. 12 represents schematically subbands produced in the case of a 3-component image with a 4:4:4 sampling pattern for 1 vertical and 5 horizontal DWT decompositions performed on each component image, representing how the packets are formed and serialized in the packed data set according to the JPEG XS standard (top) and the disclosure (bottom)

In a third example embodiment of the disclosure, the color image is a 3-component image sampled according to a 4:4:4 sampling pattern where 1 vertical and 5 horizontal DWT decompositions are performed on each component image. FIG. 12 represents schematically the subbands resulting from said DWT decompositions for all three component images; it depicts in the upper part the packets that are formed and serialized in the packed data set according to the JPEG XS standard, and in the lower part the packets that are formed and serialized in the packed data set according to the method of the disclosure. As in FIG. 8, the numbered arrows represent the grouping of component samples in packets and the order in which said packets are appended to the packed data set.

Example 4

Figure 13:
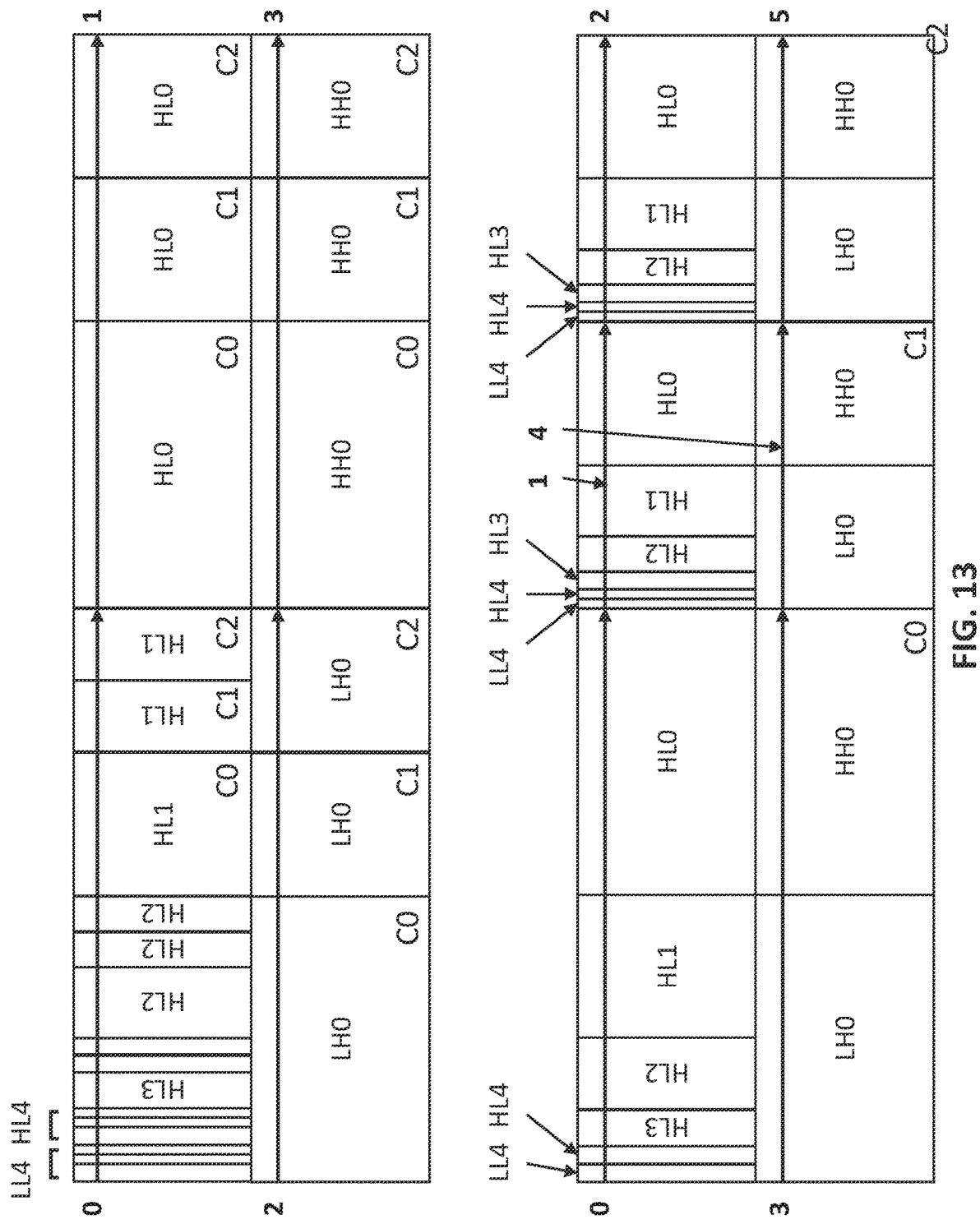
FIG. 13 represents schematically subbands produced in the case of a 3-component image with a 4:2:2 sampling pattern for 1 vertical and 5 horizontal DWT decompositions performed on each component image, representing how the packets are formed and serialized in the packed data set according to the JPEG XS standard (top) and the disclosure (bottom)

In a fourth example embodiment of the disclosure, the color image is a 3-component image sampled according to a 4:2:2 sampling pattern where 1 vertical and 5 horizontal DWT decompositions are performed on each component image. FIG. 13 represents schematically the subbands resulting from said DWT decompositions for all three component images; it depicts in the upper part the packets that are formed and serialized in the packed data set according to the JPEG XS standard, and in the lower part the packets that are formed and serialized in the packed data set according to the method of the disclosure. As in FIG. 8, the numbered arrows represent the grouping of component samples in packets and the order in which said packets are appended to the packed data set.

For comparing how packets are formed and appended to the packed data set in the JPEG XS standard and in the present disclosure, Table 1 shows subbands numbering for an image with 3 components where each component is decomposed by 1 vertical and 5 horizontal DWT decompositions. This applies for the images of FIG. 12 and FIG. 13. This is also applicable for a 4-component image in which 3 components are decomposed by 1 vertical and 5 horizontal DWT decompositions, and the 4th component is not decomposed, as is the case for FIG. 10 and FIG. 11.

TABLE 1

| Subband # | Subband name | Subband # | Subband name | Subband # | Subband name |
|---|---|---|---|---|---|
| 0 | LL4 ($C_0$) | 1 | LL4 ($C_1$) | 2 | LL4 ($C_2$) |
| 3 | HL4 ($C_0$) | 4 | HL4 ($C_1$) | 5 | HL4 ($C_2$) |
| 6 | HL3 ($C_0$) | 7 | HL3 ($C_1$) | 8 | HL3 ($C_2$) |
| 9 | HL2 ($C_0$) | 10 | HL2 ($C_1$) | 11 | HL2 ($C_2$) |
| 12 | HL1 ($C_0$) | 13 | HL1 ($C_1$) | 14 | HL1 ($C_2$) |
| 15 | HL0 ($C_0$) | 16 | HL0 ($C_1$) | 17 | HL0 ($C_2$) |
| 18 | LH0 ($C_0$) | 19 | LH0 ($C_1$) | 20 | LH0 ($C_2$) |
| 21 | HH0 ($C_0$) | 22 | HH0 ($C_1$) | 23 | HH0 ($C_2$) |
| 24 | (undecomposed component) | — | — | — | — |

Table 2 shows the JPEG XS progression order for the images of FIG. 12 (top) and FIG. 13 (top), as adapted from Table B-6 in Reference 1. The packet index corresponds to the numbered arrows of FIG. 12 (top) and FIG. 13 (top).

TABLE 2

| Packet index | Line number | Included subbands |
|---|---|---|
| 0 | 0 | (0, 1, 2) (3, 4, 5) (6, 7, 8) (9, 10, 11) (12, 13, 14) |
| 1 | 0 | (15, 16, 17) |
| 2 | 1 | (18, 19, 20) |
| 3 | 1 | (21, 22, 23) |

Table 3 shows the progression order for the images of FIG. 12 (bottom) and FIG. 13 (bottom), as resulting from the method of the disclosure. The packet index corresponds to the numbered arrows of FIG. 12 (bottom) and FIG. 13 (bottom).

TABLE 3

| Packet index | Line number | Included subbands |
|---|---|---|
| 0 | 0 | (0, 3, 6, 9, 12, 15) |
| 1 | 0 | (1, 4, 7, 10, 13, 16) |
| 2 | 0 | (2, 5, 8, 11, 14, 17) |
| 3 | 1 | (18, 21) |
| 4 | 1 | (19, 22) |
| 5 | 1 | (20, 23) |

Table 4 shows the JPEG XS progression order for a 4-component image in which 3 components are decomposed by 1 vertical and 5 horizontal DWT decompositions and the 4th component is not decomposed. Adapted from Table B-10 in Reference 1. The undecomposed component is treated as a single subband with 2 subband lines. Each subband line of the undecomposed component is included in its own packet. See Table 1 for subbands numbering. The packet index corresponds to the numbered arrows of FIG. 11.

TABLE 4

| Packet index | Line number | Included subbands |
|---|---|---|
| 0 | 0 | (0, 1, 2) (3, 4, 5) (6, 7, 8) (9, 10, 11) (12, 13, 14) |
| 1 | 0 | (15, 16, 17) |
| 2 | 1 | (18, 19, 20) |
| 3 | 1 | (21, 22, 23) |
| 4 | 0 | (24) |
| 5 | 1 | (24) |

Table 5 shows the progression order resulting from the disclosure in the same case as for Table 4, i.e. a 4-component image in which 3 components are decomposed by 1 vertical and 5 horizontal DWT decompositions, and the 4th component is not decomposed. The packet index corresponds to the numbered arrows of FIG. 10.

TABLE 5

| Packet index | Line number | Included subbands |
|---|---|---|
| 0 | 0 | (0, 3, 6, 9, 12, 15) |
| 1 | 0 | (1, 4, 7, 10, 13, 16) |
| 2 | 0 | (24) |
| 3 | 0 | (2, 5, 8, 11, 14, 17) |
| 4 | 1 | (18, 21) |
| 5 | 1 | (19, 22) |
| 6 | 1 | (24) |
| 7 | 1 | (20, 23) |

Table 6 provides a comparison of packets properties between the JPEG XS standard and the present disclosure in the cases addressed in the previous paragraph.

TABLE 6

| | Number of packets | | Min/Max packet size (in image width units) | |
|---|---|---|---|---|
| Sampling pattern | JPEG XS | Disclosure | JPEG XS | Disclosure |
| Bayer (FIG. 10, FIG. 11) | 6 | 8 | 0.5/0.75 | 0.5/0.5 |
| 4:4:4 (FIG. 12) | 4 | 6 | 1.5/1.5 | 1/1 |
| 4:2:2 (FIG. 13) | 4 | 6 | 1/1 | 0.5/1 |

The compression method according to the disclosure differs and offers advantages with respect to the method of the JPEG XS standard in several aspects detailed hereafter. First, more packets may be generated according to the disclosure than in the prior art solution, while keeping the maximal packet size smaller than or equal to the minimal packet size in the prior art solution (see Table 6). Having smaller packets allows a reduction of the size of packet buffers. A packet buffer may be a storage that accumulates a whole packet before making it available at its output, such buffer being needed for instance in order to smooth the data rate of the packed data set. However, smaller packets in a given packed data set means more packets, which increases the fixed cost needed to keep track of packet-related metadata in the packed data set, such as the position and size of each packet, which may take the form of packet headers, as in the JPEG XS standard. Said metadata does not contain any information related to the original color image. Therefore, more metadata means less image quality for a given size of the packed data set. The disclosure allows a good trade-off between the size and the number of packets, allowing a reduction of the size of the packet buffers while keeping roughly the same amount of packet-related metadata compared to the prior art.

Second, according to the disclosure, a given packet contains only samples from a single line of a given component image, and therefore said packet contains only samples derived from a single line of the original color image. In comparison, the JPEG XS standard prescribes that any packet containing samples from any DWT decomposed component image must contain samples from all DWT decomposed component images. Therefore, such packet may contain samples derived from several lines of the original color image, for instance in the case of Bayer sampling pattern (see FIG. 11). Having only samples derived from a single line of the original color image in a given packet allows a reduction of the size of reorder buffers compared to the prior art. A reorder buffer may be a storage that accumulates samples after forward decorrelative transforms and DWT decompositions at encoder, and outputs them in an order suitable for the inverse decorrelative transforms and DWT decompositions at decoder. Indeed, due to algorithmic dependence between DWT decompositions, samples resulting from a higher number of DWT decompositions are produced at encoder after samples resulting from a lower number of DWT decompositions. However, such samples resulting from a higher number of DWT decompositions are needed at decoder before samples resulting from a lower number of DWT decompositions. Therefore, reordering of samples may be needed between encoder and decoder, which may be performed by means of a reorder buffer. An example of reduction of the reorder buffer size in the case of Bayer sampling pattern is described hereafter. In the JPEG XS standard, a reorder buffer needs to accumulate at least two lines of data in order to output a given packet, because of the need to include samples from all DWT-decomposed component images inside the packet, samples from one of these component images being available only after two lines of data have been processed by the DWT decompositions. In addition, the fact that samples from the undecomposed component images are packed after samples from the decomposed component images means that they must be stored in the reorder buffer until all samples from decomposed component images have been processed. In comparison, according to the disclosure, a reorder buffer must only accumulate a single line of data because a given packet only contains data derived from a single line of the original color image. In addition, samples from undecomposed component images are treated the same way as samples from the decomposed component images, therefore avoiding the need to store them until all samples from decomposed component images have been processed. These two features allow a reduction of the reorder buffer size compared to the prior art.

Finally, in a hardware implementation of the method in the form of a hardware device, a reduction of buffer sizes allows a reduction of the die area and thus a reduction of the fabrication cost of the hardware device, thereby providing a more efficient method for compressing and decompressing of a color image. In a software implementation of the method in the form of a computer program, a reduction of buffer sizes allows a reduction of the memory usage and thus a reduction of the cost and power consumption of the computer executing the computer program, thereby also providing a more efficient method for compressing and decompressing of a color image.

The drawings of the figures are neither drawn to scale nor proportioned. Generally, identical components are denoted by the same reference numerals in the figures.

The invention claimed is:

1. A method for compressing a color image comprising color image samples $S_{ij}$ arranged in a reference grid according to a sampling pattern, the reference grid comprising a number of lines and columns, the index i starting at 0 and increasing with the lines, and the index j starting at 0 and increasing with the columns, into a packed data set, the method comprising:
 a) performing a decorrelative transform, wherein for each position (i,j) of the reference grid, a component sample $C_{kij}$ is determined, k being a component index depending on the sampling pattern, $C_{kij}$ being a linear combination of the image samples $S_{i'j'}$ at positions (i',j'), wherein i' is comprised between i−4 and i+4, and j' is comprised between j−4 and j+4, producing component images C0, C1, and C2, and, depending on the sampling pattern, an optional component image C3;
 b) repeating for each component Ck:
  Nlky being a number of vertical DWT decompositions to be applied to component Ck, being an integer >=0,
  Nlkx being a number of horizontal DWT decompositions to be applied to component Ck, being an integer >=Nlky,
  considering the component Ck as an auxiliary subband;
  if Nlky>0, repeat, for n=0 to Nlky−1,
  performing on said auxiliary subband a vertical DWT decomposition, by performing a lifting scheme with (5,3) filter-bank on the columns of said auxiliary subband, the resulting even numbered samples being a LLn subband, the resulting odd numbered samples being a LHn subband, keeping for each resulting sample a reference to the position (i,j) in the reference grid wherefrom they are determined;
  performing on said LLn subband a horizontal DWT decomposition, by performing a lifting scheme with (5,3) filter-bank on the lines of said subband, the resulting even numbered samples being a LLn subband, the resulting odd numbered samples being a HLn subband, keeping for each resulting sample a reference to the position (i,j) in the reference grid wherefrom they are determined;
  performing on said LHn subband a horizontal DWT decomposition, by performing a lifting scheme with (5,3) filter-bank on the lines of said subband, the resulting even numbered samples being a LHn subband, the resulting odd numbered samples being a HHn subband, keeping for each resulting sample a reference to the position (i,j) in the reference grid wherefrom they are determined;
  considering subband LLn as an auxiliary subband,
  if Nlkx>Nlky, repeat, for n=Nlky to Nlkx−1,
  performing on said LLn−1 subband a horizontal DWT decomposition, by performing a lifting scheme with (5,3) filter-bank on the lines of said subband, the resulting even numbered samples being a LLn subband, the resulting odd numbered samples being a HLn subband, keeping for each resulting sample a reference to the position (i,j) in the reference grid wherefrom they are determined; and
  considering subband LLn as an auxiliary subband; and
 c) for each consecutive line of the reference grid,
  for each component Ck,
   grouping all samples of said component Ck in said line in one or more packets; and
   appending said one or more packets to the packed data set.

2. The method according to claim 1, wherein the number Nlky of vertical DWT decompositions is equal to 0 or 1.

3. The method according to claim 1, wherein between step b) and step c), an entropy coding of the data is performed.

4. The method according to claim 3, wherein said entropy coding comprises an entropy coding of the bitplane count of groups of samples.

5. The method according to claim 4, further comprising:
 grouping bitplane counts of groups of samples; and
 grouping data representing the bitplanes.

6. The method according to claim 1, wherein in said sampling pattern, each pixel position comprises samples arranged in a Bayer pattern, a Bayer pattern being, for each even i and j coordinates in the reference grid, a juxtaposition of a red pixel R at position (i,j), a first green pixel G1 at position (i,j+1), a second green pixel G2 at position (i+1,j), and a blue pixel B at position (i+1,j+1), said decorrelative transform producing a component image C0 for the positions of the red pixels, a component image C1 for the positions of the first green pixels, a component image C2 for the positions of the second green pixels, and a component image C3 for the positions of the blue pixels.

7. The method according to claim 1, wherein in said sampling pattern, each pixel position comprises samples arranged in a 4:4:4 pattern, a 4:4:4 pattern being, for each i and j coordinates in the reference grid, a superposition at position (i,j) of a luminance pixel Y, a blue chrominance pixel Cb, and a red chrominance pixel Cr, or of a red pixel R, a green pixel G, and a blue pixel B, said decorrelative transform producing a component image C0 for the positions of the luminance or red pixels, a component image C1 for the positions of the blue chrominance or green pixels, and a component image C2 for the positions of the red chrominance or blue pixels.

8. The method according to claim 1, wherein in said sampling pattern, each pixel position comprises samples arranged in a 4:2:2 pattern, a 4:2:2 pattern being, for each i and each even j coordinates in the reference grid, an arrangement at position (i,j) of a luminance pixel Y, a blue chrominance pixel Cb, and a red chrominance pixel Cr, and a luminance pixel Y at position (i,j+1), said decorrelative transform producing a component image C0 for the positions of the luminance pixels, a component image C1 for the positions of the blue chrominance pixels, and a component image C2 for the positions of the red chrominance pixels.

9. The method according to claim 1, wherein said decorrelative transform is an identity mapping, and wherein each sample of the color image is mapped to a corresponding position on the component images.

10. The method according to claim 1, wherein said decorrelative transform is an in-line Star-Tetrix transform.

11. The method according to claim 1, wherein said decorrelative transform is a full Star-Tetrix transform.

12. A device for compressing a color image, the color image comprising color image samples Sij arranged in a reference grid according to a sampling pattern, the reference grid comprising a number of lines and columns, the index i starting at 0 and increasing with the lines, and the index j starting at 0 and increasing with the columns, into a packed data set, the device comprising:
   one or more electronic components configured to perform step a) of the method of claim 1;
   one or more electronic components configured to perform step b) of the method of claim 1; and
   one or more electronic components configured for perform step c) of the method of claim 1.

13. A non-transitory computer readable media comprising instructions which, when the program is executed by a computer, cause the computer to carry out the method of claim 1.

14. A method for decompressing a packed data set obtainable by performing the method according to claim 1, the method for decompressing comprising:
   unpacking the packets comprised in the packed data set;
   performing an inverse DWT decomposition; and
   performing an inverse decorrelative transform.

15. A non-transitory computer readable media comprising instructions which, when the program is executed by a computer, causes the computer to carry out the method of claim 14.

16. A device for decompressing a packed data set obtainable by performing the method according to claim 1, comprising:
   one or more electronic components configured to:
     unpack the packets comprised in the packed data set;
     perform an inverse DWT decomposition; and
     perform an inverse decorrelative transform.

17. A method for compressing a color image comprising color image samples Sij arranged in a reference grid according to a sampling pattern, the reference grid comprising a number of lines and columns, the index i starting at 0 and increasing with the lines, and the index j starting at 0 and increasing with the columns, into a packed data set, the method comprising:
   a) performing a decorrelative transform, wherein for each position (i,j) of the reference grid, a component sample Ckij is determined, k being a component index depending on the sampling pattern, Ckij being a linear combination of the image samples Si'j' at positions (i',j'), wherein i' is comprised between i−4 and i+4, and j' is comprised between j−4 and j+4, producing component images C0, C1, and C2, and, depending on the sampling pattern, an optional component image C3;
   b) repeating for each component Ck:
     Nlky being a number of vertical DWT decompositions to be applied to component Ck, being an integer >=0,
     Nlkx being a number of horizontal DWT decompositions to be applied to component Ck, being an integer >=Nlky,
     considering the component Ck as an auxiliary subband;
     if Nlky >0, repeat, for n=0 to Nlky−1,
       performing on said auxiliary subband a vertical DWT decomposition, by performing a lifting scheme with (5,3) filter-bank on the columns of said auxiliary subband, the resulting even numbered samples being a LLn subband, the resulting odd numbered samples being a LHn subband, keeping for each resulting sample a reference to the position (i,j) in the reference grid wherefrom they are determined;
       performing on said LLn subband a horizontal DWT decomposition, by performing a lifting scheme with (5,3) filter-bank on the lines of said subband, the resulting even numbered samples being a LLn subband, the resulting odd numbered samples being a HLn subband, keeping for each resulting sample a reference to the position (i,j) in the reference grid wherefrom they are determined;
       performing on said LHn subband a horizontal DWT decomposition, by performing a lifting scheme with (5,3) filter-bank on the lines of said subband, the resulting even numbered samples being a LHn subband, the resulting odd numbered samples being a HHn subband, keeping in for each resulting sample a reference to the position (i,j) in the reference grid wherefrom they are determined;
     considering subband LLn as an auxiliary subband, if Nlkx > Nlky, repeat, for n=Nlky to Nlkx−1,
       performing on said LLn−1 subband a horizontal DWT decomposition, by performing a lifting scheme with (5,3) filter-bank on the lines of said subband, the resulting even numbered samples being a LLn subband, the resulting odd numbered samples being a HLn subband, keeping for each resulting sample a reference to the position (i,j) in the reference grid, wherefrom they are determined; and
     considering subband LLn as an auxiliary subband; and
   c) for each consecutive line of the reference grid,
     for each component Ck,
       grouping all samples of said component Ck in said line in one or more packets; and
       appending the one or more packets to the packed data set, wherein the packed data set comprises:
       a sequence of the packets, wherein each of the packets contains only data from a single component image, wherein each of the packets contains only data from a single line of a component image, and wherein all of the packets containing data from a given line of a component image are located in the packed data set before any packet containing data from a subsequent line of any component image.

* * * * *

UNITED STATES PATENT AND TRADEMARK OFFICE
CERTIFICATE OF CORRECTION

| | |
|---|---|
| PATENT NO. | : 11,606,578 B1 |
| APPLICATION NO. | : 17/412392 |
| DATED | : March 14, 2023 |
| INVENTOR(S) | : Allan Barrea et al. |

It is certified that error appears in the above-identified patent and that said Letters Patent is hereby corrected as shown below:

In the Claims

Claim 17, Column 16, Line 42, "grid, wherefrom" should read --grid wherefrom--.

Signed and Sealed this
Twenty-seventh Day of June, 2023

Katherine Kelly Vidal
*Director of the United States Patent and Trademark Office*